United States Patent

[11] 3,568,766

| [72] | Inventor | David G. Thomas |
| | | Oak Ridge, Tenn. |
| [21] | Appl. No. | 806,169 |
| [22] | Filed | Mar. 11, 1969 |
| [45] | Patented | Mar. 9, 1971 |
| [73] | Assignee | the United States of America as represented by the United States Atomic Energy Commission |

[54] CORRUGATED HEAT EXCHANGE MEMBER FOR EVAPORATION AND CONDENSATION
8 Claims, 5 Drawing Figs.

[52] U.S. Cl. .................................................. 165/181, 202/236
[51] Int. Cl. .................................................. F28f 1/42
[50] Field of Search .................................................. 165/179, 181, 183, 154; 165/177; 203/89; 202/236; 159/28

[56] References Cited
UNITED STATES PATENTS

| 3,291,704 | 12/1966 | Diedrich et al. | 202/236 |
| 3,307,614 | 3/1967 | Rosenglad | 159/28 |
| 3,493,040 | 2/1970 | Davidson | 202/236X |
| 349,060 | 9/1886 | Serve | 165/179 |

FOREIGN PATENTS

| 895,941 | 5/1962 | Great Britain | 165/154 |

*Primary Examiner*—Martin P. Schwadron
*Assistant Examiner*—Theophil W. Streule
*Attorney*—Roland A. Anderson ABSTRACT: An improved heat exchange member having an evaporating surface on one side and a condensing surface on the opposite side is provided. The improved heat exchange member is fabricated of thin sheet material formed with spaced-apart longitudinally extending corrugations which draw condensate from the condensing surfaces and feed liquid to the evaporating surfaces between corrugations as a result of surface tension effects. The heat exchange member and corrugations therein are designed to operate in a vertical inclination to facilitate liquid flow along the corrugations. A thin film of liquid is maintained on the condensing and evaporating surfaces between corrugations with a resulting increase in the overall heat transfer coefficient. The heat exchange member may assume tubular as well as flat platelike configurations.

CORRUGATED HEAT EXCHANGE MEMBER FOR EVAPORATION AND CONDENSATION

BACKGROUND OF THE INVENTION

The invention described herein relates generally to heat exchangers and more particularly to a corrugated heat exchange member fabricated of thin sheet material and suitable for simultaneous operation as an evaporator and condenser in a sea water distillation unit. It was made in the course of, or under, a contract with the U.S. Atomic Energy Commission.

The worldwide interest in desalination of sea water as a source of fresh water has resulted in various desalting schemes. One such scheme which is not new but which is nevertheless of continuing interest is referred to as the distillation process. In that process, sea water is partially evaporated and the remaining concentrated brine returned to the ocean. The evaporated portion is then condensed in the form of fresh water.

Although the distillation process is and has been in routine use form for many years, it remains unattractive economically for large scale desalination in most areas of the world because of the relatively high cost of producing fresh water using distillation techniques. One important factor affecting the cost of distilling water is the cost of heat exchangers for evaporating the sea water and for condensing the resulting vapors. Such heat exchangers not only represent a significant capital investment but their efficiency of operation greatly affects the cost of fresh water produced. Hence, considerable effort has been expended in increasing the efficiency and lowering the cost of heat exchangers for distillation apparatus.

It is well-known that vertical grooves and crests in a heat transfer surface can increase both the film condensing and film evaporating heat transfer coefficients. The mechanism causing an increase in the condensation heat transfer coefficient is believed to be that of surface tension forces causing condensate to drain from the crests into adjacent grooves, thereby reducing the film thickness and enhancing the heat transfer through the crest areas. In the case of evaporation, the channels carry feed water or distilland which is drawn from the channels in a thin film onto the crest areas due to surface tension forces. Thin films have long been recognized as desirable in both evaporative and condensing processes because of the insulating properties of water.

Prior art heat exchange members using grooves and crest have been referred to as fluted in some cases and corrugated in others. Such systems typically used a continuous corrugation in the sense that a crest would begin where a groove ended and vice versa. Systems using continuous corrugation, while providing an improvement in heat transfer coefficients as compared to noncorrugated surfaces, still had the undesirable effect of causing the thin film portions of the condensate and feed water, which are positioned along the crests on their respective sides of the heat transfer wall, to be back-to-back with relatively thick channels of respective feed water and condensate positioned in the channel opposite each crest. Because of the insulating qualities of water, the thick fillets of water limited the heat transfer which could occur through the crest areas where the desirable thin films occurred.

It is, accordingly, a general object of the invention to provide heat transfer members characterized by high overall heat transfer coefficients.

A more particular object of the invention is to provide a corrugated heat exchange member fabricated of uniformly thin sheet material wherein thin film evaporation occurs on a surface back-to-back with a surface whereon thin film condensation occurs.

SUMMARY OF THE INVENTION

In accordance with the invention, an improved corrugated heat exchange member is provided which is characterized by thin film conditions and back-to-back orientation of condensing and evaporating surfaces. The improved member is fabricated of thin sheet material formed with spaced-apart longitudinally extending corrugations for drawing condensate from the condensing surfaces and feeding liquid to the evaporating surfaces between corrugations by utilizing surface tension effects. A vertical inclination of the heat exchange member and corrugations facilitates liquid flow along the corrugations. A high overall heat transfer coefficient results from the combined effects of the thin film conditions present on the surface between corrugations and the back-to-back positioning of the condensing and evaporating surfaces.

DESCRIPTION OF THE PREFERRED EMBODIMENTS

Figure 1:
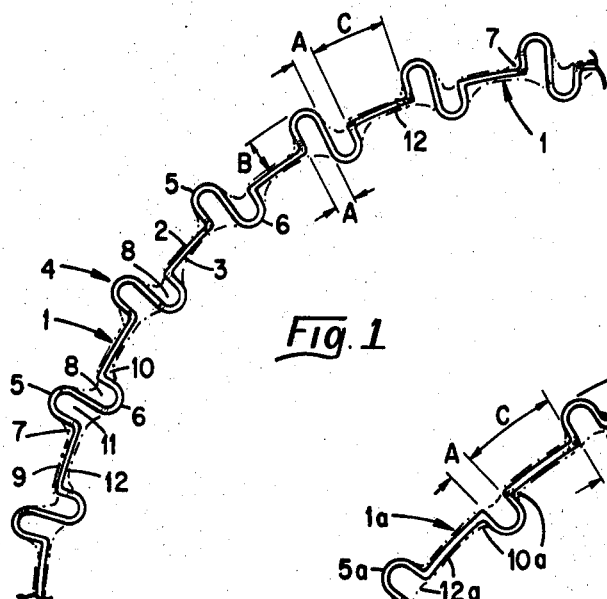
FIG. 1 is a fragmentary transverse plan view of a tubular heat exchanger made in accordance with the invention.

The invention may best be understood by reference to the accompanying drawings, initially to FIG. 1 where an enlarged, fragmentary, transverse plan view of one form of the invention is schematically illustrated. As shown, the invention is applied to a tubular heat exchanger which is the heat exchanger configuration of greatest interest for desalination applications. A plurality of plane wall portions 1 define condensing surfaces 2 which are positioned back-to-back with evaporating surfaces 3. The term "plane" used to describe wall portions 1 is not used in a restrictive sense but is intended to encompass both flat and curved heat exchange surfaces normally found in the heat exchanger art. In the tubular heat exchanger illustrated in FIG. 1, for example, wall portions 1 are actually longitudinal segments of a hollow tube. Thus the term "plane" is meant to refer to the undeformed heat exchanger wall portions between corrugations which correspond to the nominal noncorrugated shape of the heat exchanger, whether it be tubular or flat. Longitudinally extending corrugations 4, in the form of U-shaped folds or bends in the tube wall, border each plane wall portion. Rectangular or V-shaped folds could also be used according to the invention although the U-shaped folds shown are believed preferable from a fabrication standpoint. In the embodiment of FIG. 1, each outwardly projecting fold or bend 5 is integrally joined with an inwardly projecting fold or bend 6 to form a continuous serpentine curve in transverse section.

In operation, surface tension forces cause condensate to be drawn from condensing surfaces 2 into rivulets in channels 7 along the base of each outwardly projecting fold 5 and in channels 8 formed by inwardly projecting folds 6. A condensate profile similar to that shown by broken line 9 is achieved with only a thin film of condensate existing along condensing surfaces 2. The benefits thus achieved are twofold: condensate removal is facilitated by the large mass flow achieved in the rivulets, and by limiting the condensate on condensing surface 2 to a thin film, heat transfer through that surface is greatly increased over thick film conditions. On the opposite, evaporating side of the tubular heat exchanger, liquid feed such as brine travels in rivulet flow downward along channels 10 formed at the base of each inwardly projecting fold, and along channels 11 formed behind outwardly projecting folds. A liquid feed profile, illustrating the effects of surface tension forces, is shown by broken line 12. Channels 10 and 11 supply a thin film of liquid feed to evaporating surfaces 3 to make up for evaporation losses therefrom.

Figure 2:
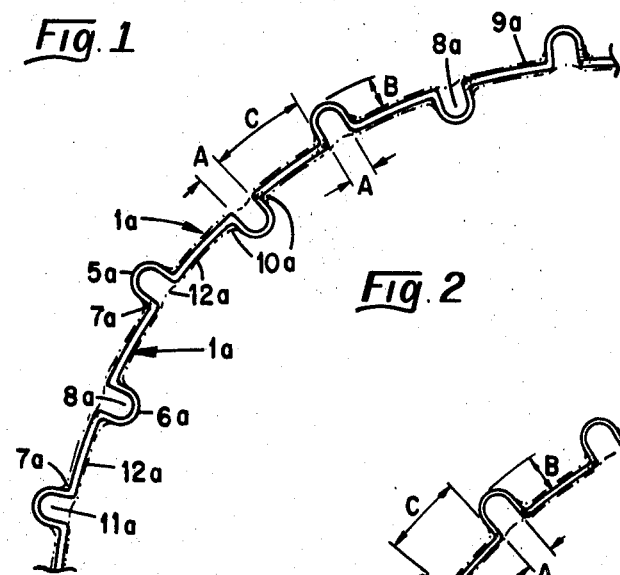
FIGS. 2 and 3 are views similar to FIG. 1, illustrating alternative forms of the invention.
Figure 3:
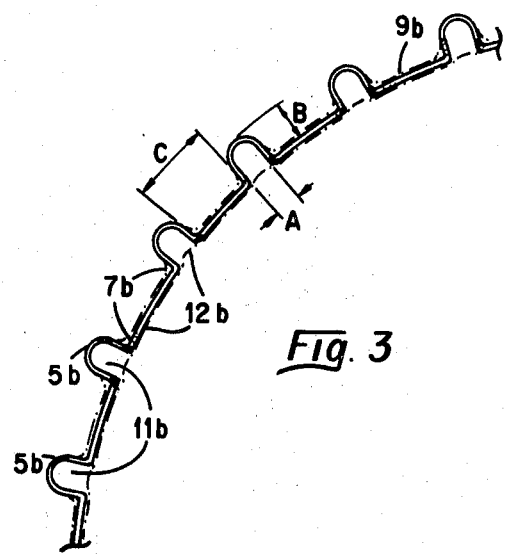

Referring now to FIGS. 2 and 3 where additional forms of the invention are illustrated, tubular heat exchangers similar to that of FIG. 1 but with variations in the orientation of corrugations are shown. Elements corresponding to elements identified in reference to FIG. 1 are identified with identical numerals followed respectively by the letters $a$ and $b$ in FIGS. 2 and 3. In the tubular heat exchanger of FIG. 2, plane wall portions 1a are bordered by outwardly and inwardly projecting U-shaped folds 5a and 6a spaced apart alternately about the tube. FIG. 3 illustrates a further variation in that only outwardly projecting U-shaped folds 5b are used. Surface tension forces cause condensate to be drawn into channels 7a and 7b along the base of the outwardly projecting folds 5a and 5b and into channels 8a behind inwardly projecting folds 6a to form condensate profiles 9a and 9b. Similarly, on the opposite, evaporating side of the tubular heat exchanger, liquid feed travels downward along channels 10a formed at the base of each inwardly projecting fold 6a, and along channels 11a and 11b formed behind outwardly projecting folds 5a and 5b. Liquid feed profiles 12a and 12b are formed as a result of surface tension forces.

The operation of the heat exchange tubes of FIGS. 2 and 3 is basically the same as that of FIG. 1 except that some variation in feed and condensate flow capacity is a caused by the different arrangements of U-shaped projections. Such variation is occasioned by the greater capacity of the flow channels formed behind each projecting fold as compared to the flow channels formed along the base of each fold, and by the different number of folds provided in the embodiment of FIG. 1 as compared to those of FIGS. 2 and 3.

Figure 4:
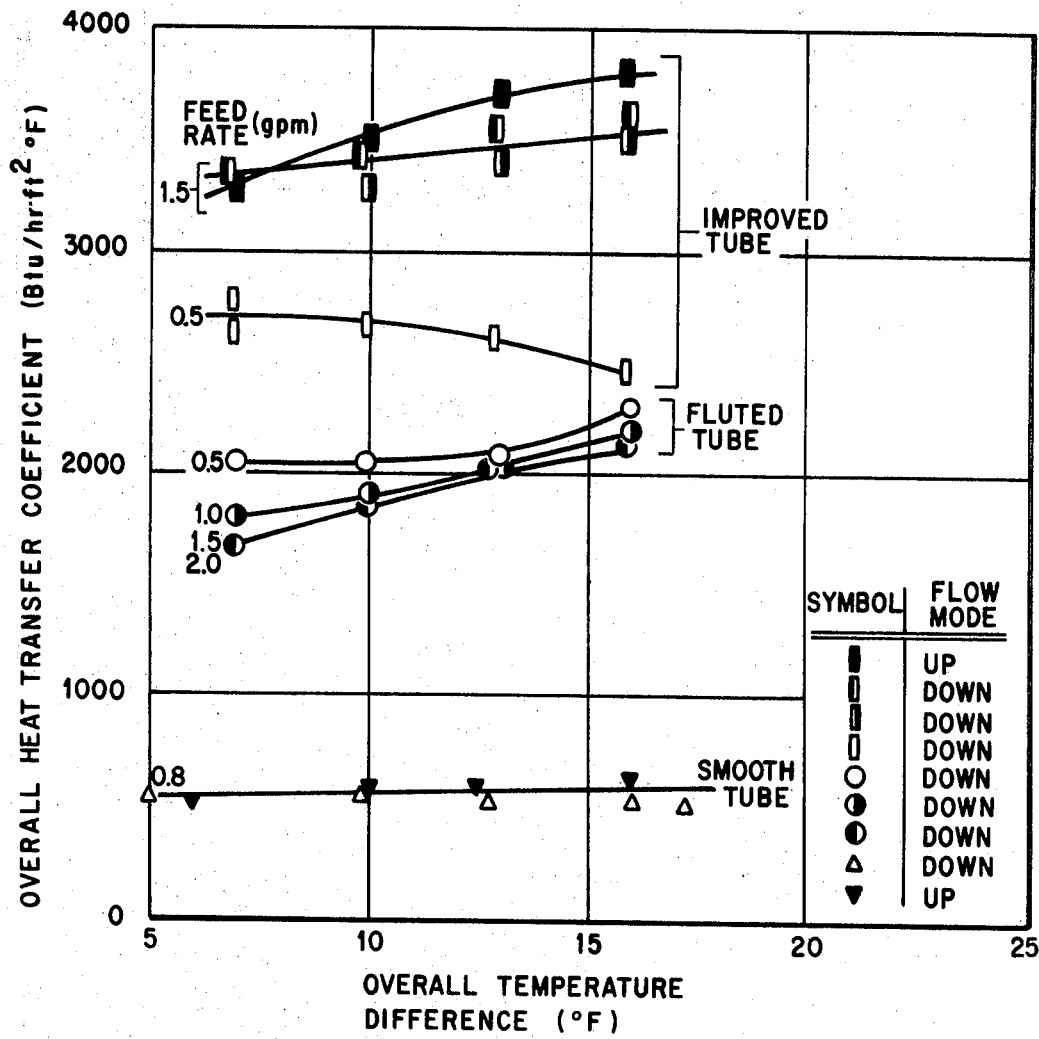
FIG. 4 is a graph showing the effect of overall temperature difference and feed rate on the overall heat transfer coefficient using tubular heat exchangers made in accordance with the prior art and with the invention.
Figure 5:
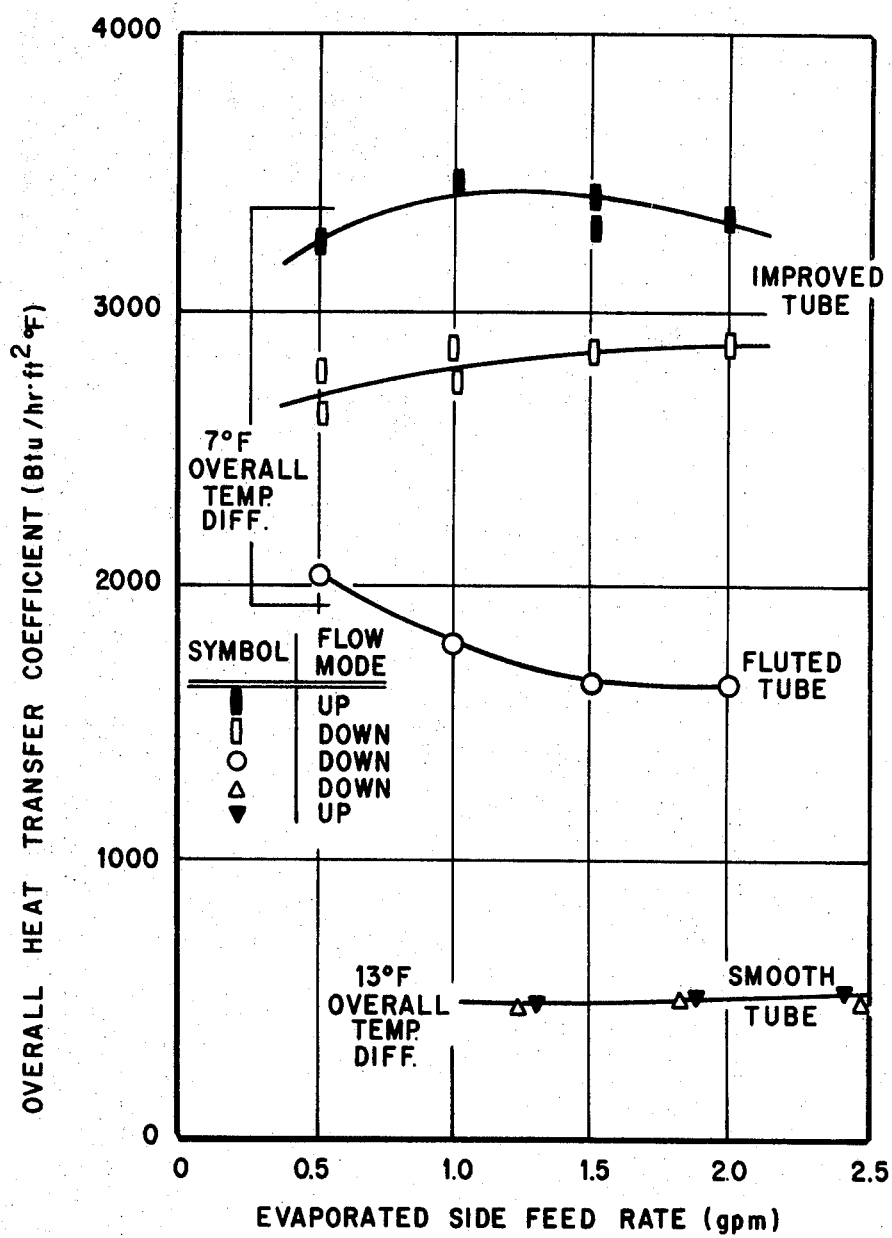
FIG. 5 is a graph showing the effect of feed rate on the overall heat transfer coefficient using tubular heat exchangers made in accordance with the prior art and with the invention.

A series of experiments were performed with a tube having a transverse section as shown in FIG. 1. The tube was 24 inches long with a 0.005-inch wall thickness and a 2-inch outside diameter. The dimensions of the projections and plane sections were as follows with reference to the reference letters shown in FIG. 1: $A = 0.030$ inch, $B = 0.070$ inch and $C = 0.130$ inch. The tube was tested in upflow and downflow modes and its heat transfer characteristics compared with a smooth wall tube and a doubly fluted tube similar to that described in U.S. Pat. No. 3,291,704 by Diedrich et al., while operating under the same conditions. The performance of the tube made in accordance with the invention along with that of the smooth and doubly fluted tubes is shown in FIGS. 4 and 5. As indicated, the performance of the tube made in accordance with the invention greatly exceeded that of both the smooth walled and the doubly fluted tubes. Overall heat transfer coefficients from about 5 to 7 times greater than those of a smooth tube and from about 1.5 to 2 times greater than doubly fluted tubes, as described in U.S. Pat. No. 3,291,704, were achieved using applicant's improved tube.

Further experimentation and calculation have indicated that a range of values for A, B and C as shown in FIGS. 1, 2 and 3 may be used without departing from the scope of applicant's invention. Values of A from 0.01 to 0.1 inch, B from 0.02 to 0.2 inch, and C from 0.05 to 0.4 inch may be used and the benefits of applicant's invention still obtained.

The above description of three forms of the invention is offered t for illustrative purposes only and should not be interpreted in a limiting sense. For example, the tubular heat exchangers described could have their evaporating and condensing surfaces reversed without departing from the scope of the invention. Other arrangements and shapes of the inwardly and outwardly projecting folds will be obvious to those skilled in the art in view of applicant's teaching. It is intended, therefore, that the invention be limited only by the scope of the claims appended hereto.

I claim:

1. In a vertically oriented, thin heat exchange wall having opposed heat exchange surfaces for condensing water vapor and evaporating water, respectively, the improved means for causing said heat exchange wall to have a large overall heat transfer coefficient comprising a multiplicity of vertically extending corrugations formed in said wall, each of said corrugations being spaced apart from at least one adjacent corrugation along its entire length, said corrugations causing condensate formed on the condensing surface of said wall and feed water on the evaporating surface of said wall to be drawn through the action of surface tension forces from the wall portion between corrugations to flow channels formed by said corrugations.

2. The improvement of claim 1 wherein said heat exchange wall is a vertically oriented heat exchange tube and wherein said corrugations are formed longitudinally in the wall of said tube.

3. The heat exchange tube of claim 2 wherein said corrugations comprise U-shaped folds projecting radially outward.

4. The heat exchange tube of claim 2 wherein said corrugations comprise U-shaped folds projecting radially inward.

5. The heat exchange tube of claim 2 wherein said corrugations are spaced apart by a distance of from 0.05 to 0.4 inch along the circumference of said tube.

6. The heat exchange tube of claim 5 wherein said corrugations project beyond the wall of said tube between corrugations by a distance of from 0.02 to 0.2 inch.

7. The heat exchange tube of claim 2 wherein said corrugations comprise U-shaped folds projecting both radially inward and radially outward, and wherein pairs of inwardly and outwardly projecting folds are joined together to form a single continuous corrugation.

8. The heat exchange tube of claim 2 wherein said corrugations comprise U-shaped folds projecting both radially inward and radially outward, and wherein said folds projecting inward and outward are alternately spaced about the circumference of said tube.